United States Patent Office 3,407,171
Patented Oct. 22, 1968

3,407,171
MANUFACTURE OF RIGID HIGH IMPACT RESIST-
ANT POLYVINYL CHLORIDE-CHLORINATED
POLYETHYLENE PRODUCTS
George E. Segre, Morristown, N. J., assignor to Allied
Chemical Corporation, New York, N.Y., a corporation
of New York
No Drawing. Continuation-in-part of application Ser.
No. 308,068, Sept. 11, 1963. This application Nov.
27, 1964, Ser. No. 414,396
6 Claims. (Cl. 260—41)

ABSTRACT OF THE DISCLOSURE

Plastic pipe meeting the requirements of both ASTM Type I and Type II Specifications can be produced by extruding a dry blended mixture consisting essentially of polyvinyl chloride, a minor amount of chlorinated polyethylene and a finely divided inorganic solid selected from the group consisting of silica and calcium carbonate.

This application is a continuation-in-part of my co-pending application Ser. No. 308,068, filed Sept. 11, 1963, and now abandoned.

This invention relates to impact resistant plastic compositions and more particularly to the production of new and improved high impact resistant compositions containing polyvinyl chloride and chlorinated polyethylene. It also specifically relates to producing molded plastic products by extrusion, and especially to the production of new and improved plastic pipe.

Polymers of vinyl chloride have many useful properties which make such materials suitable for a number of applications. Unplasticized vinyl chloride polymers are characteristically rigid and relatively brittle and consequently deficient in other desired properties such as impact and shock resistance. Such deficiencies have placed a limitation on the use of the vinyl chloride polymers in many applications where strong, rigid plastics are required. The impact resistance of polyvinyl chloride has been improved by blending with minor amounts of chlorinated polyethylene, including linear high molecular weight chlorinated polyethylenes. Unfortunately, the chlorinated polyethylenes, particularly the highly effective high molecular weight linear chlorinated polyethylenes, tend to be incompatible with the vinyl chloride polymers and mixtures of these resins are so resistant to blending that powerful mixing systems such as a Banbury system have been required to produce a homogeneous composition having high impact strength. Such equipment is costly to operate, but also the vigorous working involved in such processing results in substantial degradation of the resins, particularly the chlorinated polyethylene component, at the expense of the very property, high impact resistance, which the blending is intended to accomplish. The problem of obtaining impact strength with polyvinyl chloride-chlorinated polyethylene compositions also limits the use of such compositions to products which can be practically produced by the more powerful mixing systems. For example, extrusion is a very efficient procedure for producing rigid plastic sheet and is required for the manufacture of such important products as plastic pipe. However, the extrusion of such products directly from the compositions without the powerful mixing systems has not heretofore been successful.

An object of the present invention is to provide a new and improved method for preparation of impact resistant compositions containing polyvinyl chloride and chlorinated polyethylene.

Another object is to provide a method by which polyvinyl chloride and linear high molecular weight chlorinated polyethylene may be readily processed without special apparatus to form compositions of high impact resistance and superior overall properties.

A further object of the invention is to provide polyvinyl chloride-chlorinated polyethylene compositions combining excellent overall properties and capable of being readily produced for use in a variety of applications where a plastic material of high impact strength is desired.

A further object is to provide polyvinyl chloride-chlorinated polyethylene compositions for extrusion into new and improved products combining excellent overall properties including high impact resistance.

A still further object of the invention is to provide new and improved plastic pipe based on compositions of polyvinyl chloride and chlorinated polyethylene.

Other objects and advantages will be evident from the following description of the invention.

In accordance with the invention it has been found that new and improved impact resistant products are obtained by subjecting to shearing forces at elevated temperatures a composition derived by intimately admixing polyvinyl chloride along with a minor portion of chlorinated polyethylene and between about ½% to 5% by weight of finely divided silica or calcium carbonate. The shearing forces and temperature conditions required in carrying out the invention may be most advantageously obtained in conventional extruders from which a variety of useful products of improved impact resistance and excellent overall properties may be produced. The compositions may be readily prepared for extrusion by simple dry blending of the components and the resulting mixture directly charged to the extruder where the composition fluxes within a short time, often within a minute and usually within 1–5 minutes, upon heating to a temperature of at least 150° C. but below the decomposition temperature of the chlorinated polyethylene. Usually, temperatures not in excess of 230° C. are satisfactory. The flux may be then extruded with or without further working into rods or other shapes adapted to be subdivided by cutting or the like into pellets or particulate forms of for example ⅟₁₆ to ⅜₁₆ inch size suitable for feed to a finishing extruder from which the final product may be formed. An added feature of the invention is that, if desired, the shearing forces may be applied at temperatures of at least about 150° C. and below the degradation temperature of the chlorinated polyethylene and the resulting flux extruded directly in a single step into the desired product.

The present invention may be carried out with compositions containing 100 parts of total resin prepared by combining between about 65 to 97 parts by weight of a vinyl chloride polymer and 3 to 35 parts by weight of a chlorinated linear polyethylene having a chlorine content between about 15–50% by weight and high molecular weight corresponding to an intrinsic viscosity of at least 0.5 up to about 6.0 as measured in o-dichlorobenzene at 100° C. The admixture of these resins which controlled minor amounts of finely divided silica or calcium carbonate not only forms a composition which can be readily extruded into a high impact resistant material but also enables the production of products having excellent overall properties including high tensile strength, flexural strength, hot tear strength, chemical resistance and excellent aging and weathering properties making the compositions particularly suitable for manufacture into molded and extruded shapes, profiles, plastic pipe and paneling, all of particularly high quality. The products of the invention are rigid materials and in the form of sheets and film which contain little or no plasticizing substances may be used satisfactorily in vacuum molding and forming operations.

An unexpected and particularly desirable feature of the invention is the provision of extruded products of unusually superior overall properties including impact resistance from compositions containing only limited amounts of the chlorinated polyethylene. Heretofore at least 10% by total resin weight of the chlorinated polyethylene was required to obtain any substantial increase in the impact resistance of polyvinyl chloride despite the intensive treatment to which the material was usually subjected in the powerful mixing systems such as the Banbury mixer. The use of such relatively large amounts of chlorinated polyethylene to obtain impact resistance inherently reduces other physical and performance properties to the extent that the mixed product may not meet specifications for certain applications. This problem is generally applicable to the manufacture of rigid extruded products and particularly to the specific field involving rigid plastic pipe which is of increasing importance for use in the conveyance of water and other liquids. The compositions used in making plastic pipe are conventionally classified according to a number of rigid specifications. The well-known ASTM classifications of Type I and Type II are the two general categories assigned to the polyvinyl chloride compositions available for pipe manufacture. Type I polyvinyl chloride has excellent tensile strength, flexural modulus, weatherability, heat distortion resistance, and also good flame and chemical resistance. Type II polyvinyl chloride is characterized by having a minimum Izod impact resistance of at least 5 ft.-lbs. per inch of notch according to ASTM Test D256–56. Having a plastic pipe which meets both Type I and Type II requirements is not only desirable from a product quality standpoint but is also more economical in marketing and inventory. Compositions which are both Type I and Type II have not been heretofore provided but are produced by the instant invention by employing the finely divided inorganic solid together with a limited amount of chlorinated polyethylene. The finely divided silica is especially effective in producing pipe compositions combining Type I and Type II properties. In carrying out the invention to produce plastic pipe meeting both Type I and Type II requirements it is important to limit the chlorinated polyethylene content to between about 3 to 8 parts per 100 total parts of the polyvinyl chloride and chlorinated polyethylene resins in the composition. More preferably, the chlorinated polyethylene represents to between about 4 to 7 parts per 100 total parts of resin. It is also preferred in producing plastic pipe to employ a chlorinated polyethylene having a chlorine content between about 33 to 45% by weight of chemically combined chlorine.

In carrying out the instant invention the make-up of the polyvinyl chloride-chlorinated polyethylene composition and the processing conditions to which it is subjected are important factors in obtaining high impact resistant products of excellent overall properties. A particularly important component of the composition is the finely divided silica or calcium carbonate additive which permits the composition to be readily compounded into the high impact resistant products in standard mixing apparatus such as extruders without subjecting the composition to the powerful and costly mixing procedures involved with the Banbury systems. The amount of such finely divided solid required to be effective in the practice of the invention is at least about ¼% by weight of the total weight of the polyvinyl chloride and chlorinated polyethylene resins. Amounts in excess of about 5% by weight per 100 parts per weight of resin are usually unnecessary and also tend to cause loss of properties during processing. Best results are obtained with compositions incorporating between about ½ to 3% by weight of additive based on the total of polyvinyl chloride and chlorinated polyethylene resin. It is important that the silica and calcium carbonate employed in the invention have a fine particle size such that the mean or average particle size is less than about 1 micron, as determined with reference to the maximum dimension of the particles. The preferred inorganic material giving particularly good results is colloidal silica having a particle size predominantly between 0.005 to 0.10 microns, as is readily determined by electron microscope analysis.

The compositions of the invention include small amounts of a heat stabilizer to protect the resins against decomposition and suitable lubricants to facilitate processing and produce extruded products of smooth surface characteristics. Suitable stabilizers include those conventionally employed in vinyl polymer compositions. Such stabilizers are known and include inorganic salts and organic complexes and/or salts of lead, tin, barium, cadium, zinc, sodium, manganese, etc. Specific examples of such stabilizers include lead stearate, dibasic lead stearate, dibasic lead phosphite, tribasic lead sulphate, and organo-tin compounds such as dibutyl tin mercaptoester and dibutyl tin mercaptide. Suitable lubricants are also well-known and include, by way of example, stearic acid, calcium stearate, and waxes such as polyethylene wax. Certain of the stabilizers are well-known to also have lubricating properties and such compounds may of course be employed in the compositions. The presence of stabilizers and lubricants in the compositions influences the final properties of the product. The lubricants are stronger in influence and affect the ability to obtain high impact resistance. In preparation of the compositions to obtain Type I and Type II properties it is generally preferred to limit the total amount of lubricant materials to less than about 8 parts per 100 parts of total resin in the composition. Preferably, the total amount of additives having lubricant properties will range between about 1.0 to 4.0 parts per 100 parts of resin. The total amount of stabilizer employed in the compositions may range up to as high as 10 parts, but preferably is limited to about 1 to 5 parts per 100 parts of resin. The total amount of stabilizers and lubricants incorporated in the composition may be desirably limited by employing of the one or more stabilizers which also have lubricant properties. Such stabilizers include lead stearate, dibasic lead stearate, and dibutyl tin mercaptide. The compositions of the invention may also incorporate pigment fillers in amounts ranging up to about 10 parts per 100 parts of resin, preferably between about 1 to 5 parts. Examples of suitable pigment fillers include carbon black, titanium dioxide, phthalocyanine, green or blue, etc.

In the practice of the invention it is important in obtaining best results to intimately admix the components of the composition before extrusion. It has been found that simple dry blending of the components will provide a mixture which can be converted directly and rapidly from the dry blend to the extruded product having excellent properties including high impact resistance. The dry blending may be accomplished in any desired manner which insures intimate and complete mixing of the resinous components and distribution of the additives throughout the mixture such as by tumbling or by any suitable high speed high mixing equipment. A suitable conventional high speed mixer is the "Henschel" mixer manufactured by Henschel-Werke A. G. Kassel (W. Germany) and available in the United States from Prodex Corporation. The thoroughly mixed dry blend may be readily converted to the fluxed state in about ½ to 8 minutes, usually about ½ to 5 minutes, by application of heat and shear forces in the barrel of the extruder from which the product may be directly formed. Temperatures employed during extrusion to convert the dry blended composition to the fluxed state and extrude it into the molded product are of the order of about 150° C. ranging up to about 230° C. Generally, mixing of the plastic melt in the extruder for a short period of about ¼ to 3 minutes produces a product of exceptionally good overall properties including high impact resistance. Conventional twin and single screw extruders may be employed with the higher shear single screw vinyl extruders being well suited for producing plastic pipe meeting both Type I and Type II requirements. Scrap material formed on conversion of the composition into useful products may be fully reused with attendant savings thereby providing a further benefit over material prepared by Banbury processing which is usually of such quality that reuse is often impractical.

The chlorinated polyethylenes which may be generally employed in the compositions have a chlorine content between 15% to 50%, preferably 33–45% by weight, and are also desirably amorphous with a crystallinity of less than about 1% as determined by differential thermal analysis. The chlorinated ethylene polymers are also of high molecular weight corresponding to an intrinsic viscosity of at least 0.5 up to about 6.0 as measured in a 0.5% solution of o-dichlorobenzene at 100° C. Excellent compositions are produced from ultra high molecular weight chlorinated polyethylenes having an intrinsic viscosity between about 2.0 to 6.0 as measured in o-dichlorobenzene. The chlorinated polyethylenes usually are prepared by the addition of only chlorine atoms to a substantially linear high molecular weight ethylene polymer but also include the chlorinated polyethylenes containing minor amounts of about ½ to 4% sulfur as prepared by contacting linear polyethylene with sulfur dioxide, sulfuryl chloride, or other suitable chlorosulfonation agent.

The polyvinyl chloride employed may be any of the vinyl chloride polymers or copolymers thereof containing predominantly vinyl chloride with a copolymerizable vinyl compound such as vinyl acetate, vinyl maleate and vinyl fumarate. Such copolymers may be obtained commercially, for example, those copolymers containing about 85% vinyl chloride and about 15% vinyl acetate. The preferred vinyl chloride polymers employed in the composition of the invention are those having a weight average molecular weight corresponding to an intrinsic viscosity between about 0.5 to 1.1 as measured in a solution of cyclohexanone at 25° C., preferably an intrinsic viscosity between about 0.7 to 1.0 as measured in cyclohexanone at 25° C.

High impact resistant compositions of particularly excellent properties are produced from chlorinated polyethylenes having less than 1% crystallinity and an ultra high molecular weight corresponding to an intrinsic viscosity of from about 2.0 up to about 6.0 as measured in o-dischlorobenzene at 100° C. Such preferred high molecular weight chlorinated polyethylene may be produced by the chlorination of substantially linear high density polyethylene having weight average molecular weight of from about 1 million up to about 5 million. Suitable linear high molecular weight polyethylene is produced, as described in British Patent 858,674 of June 11, 1961, to Allied Chemical Corporation, by the gas phase polymerization of anhydrous, oxygen-free ethylene below the softening point of the polyethylene over a porous, frangible catalyst of an inorganic compound of chromium and oxygen and an active metal alkyl on a support of the group consisting of silica and silica-alumina. The polyethylenes produced thereby contain a residue of the chromium-silica catalyst systems dispersed throughout the polyethylene in an amount of at least about .001%, usually .001–.002%, by weight. The chromium-silica catalyst material added during polymerization is retained in the polyethylene during chlorination and contributes to the unusual properties of the chlorinated polyethylene employed in the chlorinated polyethylene-polyvinyl chloride compositions of the instant invention. Prior to chlorination the polyethylene from which the chlorinated polyethylene is derived has a density between about 0.935 and about 0.985 and a crystallinity of at least 75%, and customarily in the range of 75% to 85%, as determined, for example, by differential thermal analysis. The polyethylenes produced in accordance with British Patent 858,674 are of ultra high weight average molecular weight i.e., between 1.0 million and about 5.0 million, preferably between 1.0 to 3.5 million, as calculated according to the method of P. S. Francis et al. from the viscosity of an about 0.05 to 0.1 gram per 100 cc. solution of polymer in Decalin at 135° C. using the equation:

$$n = 6.77 \times 10^{-4} M^{0.67}$$

where:

$n$ = intrinsic viscosity
$M$ = weight average molecular weight (J. Polymer Science, vol. 31, pp. 453–466—September 1958.)

Preparation of the chlorinated polyethylene having less than 1% crystallinity for use in the compositions of the instant invention may be accomplished by two-stage suspension chlorination of the linear, high molecular weight polyethylene with the first-stage chlorination being carried out in an aqueous slurry at a temperature below the crystalline melting point of the ethylene polymer, preferably at a temperature of about 60° C. to 130° C., desirably at 90–110° C., until at least about 5 percent, preferably about 5 to 17 percent, of chlorine has been introduced into the polymer. In the second-stage the chlorination is continued in the aqueous slurry at a temperature maintained above the crystalline melting point of the polymer but below the softening point of the chlorinated outer coating thereof until the desired chlorine is added. Second-stage chlorination temperatures are of the order of at least about 135° C., and preferably lie in the range of about 135° C. to 150° C. If desired, chlorination in the second-stage may be carried out at a temperature above the crystalline melting point of the polymer for a time sufficient to add at least about 5 percent chlorine by weight, preferably until at least a total of 25 percent chlorine is added to the polymer, and the chlorination then continued at a lower temperature, e.g. 110° C. to 120° C., until the desired total chlorine is added. Chlorinated polyethylenes produced by the above-described staged process from polyethylene of about 1 to 5 million molecular weight are the particularly preferred materials and have high molecular weights corresponding to an intrinsic viscosity of from about 2.0 up to 6.0 in a 0.5% solution of o-dichlorobenzene at 100° C. Chlorinated polyethylene having less than 1% crystallinity and an intrinsic viscosity of less than approximately 2.0 in o-dichlorobenzene at 100° C. may also be prepared from the ultra high molecular weight polyethylenes by chlorination in stages in the presence of an oxidant. Generally, the oxidant may be supplied separately or along with chlorine during the overall chlorination process. Preferably, the oxidant is added along with the chlorine after the initial 5% chlorine has been added to the polymer and most desirably in the later stage after the chlorination has been conducted at a temperature above the crystalline melting point of the polymer. Suitable oxidants include benzoyl peroxide, oxygen, hydrogen peroxide, ozone, and acetyl peroxide, preferably oxygen. The total amount of oxygen employed during chlorination is preferably less than about 15% based on the amount of chlorine utilized. The oxygen is usually supplied along with the chlorine in amounts between about 0.05–2.0% based on the amount of chlorine. The chlorinated polyethylenes produced in the presence of an oxidant contain oxygen which has been added to the polymer structure in amounts between about 0.05% to 1.0% by total weight of the polymer, more usually between about 0.1% to 0.5% by weight.

The chlorinated polyethylenes containing 15–50% by weight chlorine and derived from the low pressure, crystalline, high molecular weight polyethylenes for use in the instant invention are essentially amorphous with a crystallinity of less than about 1.0%, usually 0% crystallinity, as determined by differential thermal analysis. The preferred high molecular weight chlorinated polyethylenes are characterized by being chemically inert and insoluble at 20–25° C. in organic solvents such as esters, acids and alcohols. They have tensile strength values according to ASTM Method D638–58T (at a drawing rate of 2 inches per minute) of at least about 2,500 p.s.i.., usually between about 2,500 p.s.i. and about 4,500 p.s.i. These chlorinated polyethylenes also have true ultimate tensile strengths according to ASTM Method D638–58T of at least about 11,000 p.s.i., with the preferred materials of 20–45% chlorine content having true ultimate tensile strength values between about 11,000 and 20,000. The chlorinated polyethylenes employed in the compositions of the instant invention also are characterized by relatively low glass transition temperatures within the range of at least as low as about $-10°$ C. for the 15% chlorine containing material up to no more than about 20° C. for the 50% chlorine containing material. The preferred chlorinated polyethylenes have glass transition temperatures ranging from at least as low as about $-18°$ C. for the 20% chlorine content material ranging to about 0° C. for the 45% chlorine content chlorinated polyethylene. The glass transition temperature, a second order transition temperature, can be determined by plotting the stiffness modulus of the sample as a function of temperature, and can be defined as the temperature at which the stiffness modulus of the sample possesses a value of $1.45 \times 10^4$ p.s.i. or $10^9$ dynes/cm$^2$. The determination may be made in accordance with ASTM Test D1043–41. In effect, the glass transition temperature is that temperature below which the chlorinated polymers become brittle. Above the glass transition temperature the polymers become more flexible and rubbery. The low glass transition temperatures of the chlorinated polyethylenes contribute to the ability of the compositions of the instant invention to withstand shock and impact at low temperatures even though the chlorinated polyethylene represents only a minor proportion of the total composition.

The following examples in which parts are by weight demonstrate the practice and advantages of the invention.

EXAMPLE 1

Chlorinated polyethylene having a chlorine content of about 40% by weight and an intrinsic viscosity of about 4.0 in o-dichlorobenzene at 100° C. was prepared by the aqueous slurry chlorination of linear polyethylene having a weight average molecular weight of about 1.2 million and a density of about 0.94. The chlorination of the high molecular weight polyethylene was carried out in a first stage at about 100° C. until about 15% chlorine was added followed by a second stage chlorination at a temperature of about 140° C. until about 25% chlorine was added, and then at a temperature of about 110° C. until a total of 40% chlorine by weight was added to the polymer. The high molecular weight ethylene polymer employed was prepared in accordance with British Patent 858,674 (Example 6), by gas phase polymerization of anhydrous oxygen-free ethylene over a catalyst of magnesium dichromate on a porous support of about 90% silica and 10% alumina. The chlorinated polyethylene had a glass transition temperature of about $-3°$ C. (ASTM D1043–53) and a crystallinity of less than 1% as determined by differential thermal analysis.

About 12 parts of the chlorinated polyethylene resin was charged together with about 88 parts of polyvinyl chloride resin and about 2.0 parts of silica into a high speed 100 pound capacity "Henschel" mixer supplied by Henschel-Werke A. G. Kassel (W. Germany). The polyvinyl chloride resin had a molecular weight corresponding to an intrinsic viscosity of about 0.77 in a solution of cyclohexanone at 25° C. The silica had a specific gravity of about 2.2 and particle size predominately within the range of about 0.005 to 0.05 micron. To the mixture of resins and silica there was also added about 2.5 parts of a mixture of about 1.25 parts dibutyl tin mercaptoester and dibutyl tin mercaptide as stabilizer, about 1 part of glycerol monostearate and about 1.2 parts of calcium stearate as lubricants, about 0.25 part of epoxidized soya bean oil, and about 2.0 parts of titanium dioxide. The charge was dry mixed in the "Henschel" mixer for about 12 minutes at about 1800 r.p.m. mixing speed. The resulting dry mixture was then charged to the hopper of a twin-screw extruder, Model No. RC–11 obtained from Lavorozione Materie Plastiche (Torino, Italy). The extruder charge was passed through the extruder barrel, heated at a temperature of about 180° C. and fluxed after a residence time of about 3 minutes in the barrel. The fluxed mixture was extruded and cut into pellets which were charged to the hopper of a similar two-screw extruder from which 1 inch O.D. pipe was extruded at a rate of about 60 in./min. Wall thickness of the pipe was 0.131 inch. The pipe had an even texture and exhibited a high impact strength as evidenced by resistance to cracking upon dropping a 20 pound weight onto the pipe from a height of 7 feet.

EXAMPLE 2

A polyvinyl chloride-chlorinated polyethylene composition was formulated similar to that in Example 1 except that about 1.2 parts of esterified montanic acid was employed in place of the calcium stearate. The composition was thoroughly mixed in the "Henschel" mixer and charged to the hopper of an extruder similar to that employed in Example 1 except that the twin-screws were replaced by a single high intensive shear screw. The extruder charge was mixed in the extruder over the course of a total of about 4 minutes during which time it was heated at a temperature of about 180° C. and the mixture fluxed. The residence time in the extruder in the fluxed state averaged about 2 minutes and the mixture was extruded at the rate of about 60 in./min. into flat translucent strips of about 1¾ inch width and 0.065 inch thickness. Evaluation of the extruded composition showed a high tensile strength of 6,000 p.s.i. according to ASTM D–638, a tensile modulus of $3.2 \times 10^5$ according to ASTM D–638, a flexural strength of 11,000 p.s.i. according to ASTM D–790, a flexural modulus about $3.2 \times 10^5$ according to ASTM D–790, and an Izod impact strength between about 18–20 ft. lbs./in. of notch according to ASTM D–256. The extruded composition was particularly well suited for vacuum forming operations.

EXAMPLE 3

The chlorinated polyethylene resin of the preceding examples was charged in an amount of about 4 parts together with about 96 parts of polyvinyl chloride resin and 2 parts fine calcium carbonate into a 100 pound capacity "Henschel" mixer. The polyvinyl chloride resin had a molecular weight corresponding to an intrinsic viscosity of about 0.9 as determined in cyclohexanone at 25° C. The calcium carbonate had a specific gravity of about 2.65 and a particle size within the range of about 0.1 to 8 microns with a mean particle size of about 0.6 micron. To the resins and calcium carbonate there was also added about 2.25 parts of a mixture of organo-tin heat stabilizers composed of 1.25 parts of an organo-tin compound designated T–24 and obtained from the M & T Chemicals Corporation and 1 part of an organo-tin compound designated TM–918 and obtained from the Advance Chemical Company; about 1 part of wax and 1 part of calcium stearate as lubricants; and 1 part of TiO$_2$ and 0.1 part of carbon black as pigment fillers. The charge was dry mixed in the mixer for about 12 minutes at about 1800 r.p.m mixing speed. The dry blended composition was charged to the hopper of a single-screw extruder having the extruder barrel heated to a temperature of about 180° F. After a residence time of about 3 minutes the composition was extruded into a 1 inch O.D. pipe at a rate of about 60 in./min. Wall thickness of the pipe was 0.131 inch. The pipe had an even texture and exhibited a high impact strength of 100 ft.-lbs. as determined by a weight of 20 pounds dropped from a height of 5 feet.

EXAMPLE 4

(Pipe)

The chlorinated polyethylene resin of the preceding examples was charged in an amount of 5 parts together with 95 parts of polyvinyl chloride resin and 1.5 parts silica into the 100 pound capacity "Henschel" mixer. The polyvinyl chloride resin had a molecular weight corresponding to an intrinsic viscosity of about 0.9 as determined in a cyclohexanone at 25° C. The silica employed had a specific gravity of 2.2 and particle size predominantly within the range of about 0.005 to 0.05 micron. To the resins and silica there was also added 1.25 parts of non-lubricating dibutyl-tin bis octyl-thioglycolate stabilizer and 1.25 parts of di-butyl-tin bis lauro-mercaptain as a lubricating stabilizer, about 1.5 parts calcium stearate and 1.5 parts of N,N-ethylenebis-stearamide, and 0.5 part carbon black and 1.0 part titanium dioxide as pigment fillers. This charge was dry mixed in the mixer for about 12 minutes at about 1800 r.p.m. mixing speed. The dry blended composition was charged to the hopper of a two-stage single-screw extruder having compression ratios in the first stage of about 2.5 to 1 and in the final stage of about 1.5 to 1. The extruder was heated uniformly along its barrel to a temperature of about 390° F. The composition was fluxed in the extruder barrel and extruded into pipe through a heated die maintained at a temperature of about 362° F. The extruded pipe had an outside diameter of 1 inch and wall thickness of 0.140 inch. In Tables I and II, below, the pipe composition and product produced in this example are evaluated according to the ASTM standards for Type I and Type II plastic pipe. In the Tables III and IV, below, the plastic pipe is also evaluated according to other rigid specifications customarily used by the industry.

TABLE I.—ASTM TYPE I

| Property and Test Reference | Test Standard | Example 3 Test Result |
| --- | --- | --- |
| Tensile Strength [1] ASTM D-638 | 7,000 p.s.i. | 7,400. |
| Tensile Modulus [1] ASTM D-638 | 400,000 p.s.i. | 400,000. |
| Flexural Strength [1] ASTM D-790 | 11,000 p.s.i. | 11,100 p.s.i. |
| Deflection Temp.[2] ASTM D-648 | 70° C. at 264 p.s.i. | 70° C. at 264 p.s.i. |
| Flammability ASTM D-635 | Self-extinguishing | Pass. |
| Chemical-Resistance ASTM D-543. | | Do. |

TABLE II.—ASTM TYPE III

| Impact Resistance [2] ASTM D-256 | 5.0 ft.-lb./in. of notch | 24 ft.-lb./in. of notch. |
| --- | --- | --- |

TABLE III.—DESIGN STRESS

| Stress-rupture ASTM D1598-58T | 2,000 p.s.i. design stress [3] | 2,100 p.s.i. design stress. |
| --- | --- | --- |

TABLE IV.—FALLING WEIGHT IMPACT TEST

| Falling Weight Impact (20 lb. weight from height of 5 feet). | 100 ft.-lbs. for 1 inch pipe | Pass. |
| --- | --- | --- |

[1] Test on composition prepared by milling at 370–380° F. for 20 minutes.
[2] Test on composition prepared by milling at 310–320° F. for 5–6 minutes
[3] Value representing highest hydrostatic design stress category for rigid polyvinyl chloride pipe as defined in Commercial Standard CS 256–63.

Although certain preferred embodiments of the invention have been disclosed for purpose of illustration, it will be evident that varous changes and modifications may be made therein without departing from the scope and spirit of the invention.

I claim:

1. Rigid plastic pipe meeting the requirements of both ASTM Type I and Type II Specifications, said pipe comprising (a) from 92 to 97 parts by weight of polyvinyl chloride having an intrinsic viscosity ranging from about 0.5 to about 1.1 as determined in cyclohexanone at 25° C.; (b) correspondingly from 8 to 3 parts by weight of a chlorinated linear polyethylene having a chlorine content ranging from about 15 to about 50% by weight, a crystallinity of no greater than 1% as determined by differential thermal analysis, an intrinsic viscosity ranging from about 0.5 to about 6.0 a measured in o-dichlorobenzene at 100° C. and a glass transition temperature of less than 20° C.; and (c) from about ¼ to about 5 parts by weight of finely divided calcium carbonate having an average particle size of less than 1 micron.

2. Pipe in accordance with claim 1 wherein said chlorinated polyethylene is substantially amorphorus, has a chlorine content ranging from about 33% to about 45% by weight, an intrinsic viscosity ranging from 2.0 to 6.0 and is present in an amount ranging from about 4 parts to about 7 parts per 100 parts of (a) plus (b).

3. Pipe in accordance with claim 1 wherein said calcium carbonate is present in an amount ranging from about ½ to 5 parts per 100 parts of (a) plus (b).

4. Pipe in accordance with claim 1 wherein said calcium carbonate has an average particle size ranging from 0.005 to 0.10 micron.

5. A process for producing the pipe of claim 1 comprising the steps of (1) intimately dry blending a mixture comprising: (a) from 92 to 97 parts by weight of polyvinyl chloride having an intrinsic viscosity ranging from about 0.5 to about 1.1 as determined in cyclohexanone at 25° C.; (b) correspondingly from 8 to 3 parts by weight of a chlorinated linear polyethylene having a chlorine content ranging from about 15 to about 50% by weight, a crystallinity of no greater than 1% as determined by differential thermal analysis, an intrinsic viscosity ranging from about 0.5 to about 6.0 as measured in o-dichlorobenzene at 100° C. and a glass transition temperature of less than 20° C.; and (c) from about ¼ to about 5 parts by weight of finely divided calcium carbonate having an average particle size of less than 1 micron; (2) heating the thereby resulting mixture with the concomitant application of shearing forces at a temperature ranging from about 150° C. to about 230° C. for a time sufficient to convert said mixture to the fluxed state; and (3) extruding said fluxed mixture.

6. An extruded rigid plastic profile comprising (a) from 92 to 97 parts by weight of polyvinyl chloride having an intrinsic viscosity ranging from about 0.5 to about 1.1 as determined in cyclohexanone at 25° C.; (b) correspondingly from 8 to 3 parts by weight of a chlorinated linear polyethylene having a chlorine content ranging from about 15% to about 50% by weight, a crystallinity of no greater than 1% as determined by differential thermal analysis, an intrinsic viscosity ranging from about 0.5 to about 6.0 as measured in o-dichlorobenzene at 100° C. and a glass transition temperature of less than 20° C. and (c) from about ¼ to about 5 parts by weight of finely divided calcium carbonate having an average particle size of less than one micron, said plastic profile having a tensile strength of at least 7,000 p.s.i., a modulus of elasticity of at least 400,000 p.s.i., a flexural yield strength of at least 11,000 p.s.i. and an impact strength of at least 5.0 ft.-lb./in. of notch.

References Cited

UNITED STATES PATENTS

| | | | |
|---|---|---|---|
| 2,882,254 | 4/1959 | Kloepler et al. | 260—41 |
| 3,170,902 | 2/1965 | Nagelschmidt et al. | 260—41 |
| 3,291,863 | 12/1966 | Frey et al. | 260—897 |

FOREIGN PATENTS 221,275  3/1962  Austria.

OTHER REFERENCES

Frey, H. H.: In Kunstoffe, 49, pp. 50–55, 1959, TP 986 A1 K8.

Modern Plastics Encyclopedia, issue for 1963, September 1962, vol. 40, No. 1A, pp. 614–618, TP 986 A2 M5 C.4.

Penn, W. S.: PVC Technology, Maclaren and Sons, London, 1962, pp. 212–213, TP 968 V48 Pr C.2.

MORRIS LIEBMAN, *Primary Examiner.*

J. H. DERRINGTON, *Assistant Examiner.*